United States Patent [19]

Goertzen

[11] Patent Number: 5,364,113

[45] Date of Patent: Nov. 15, 1994

[54] SELF-STEERING AXLE FOR VEHICLES

[75] Inventor: William Goertzen, Winnipeg, Canada

[73] Assignee: Motor Coach Industries, Winnipeg, Canada

[21] Appl. No.: 965,731

[22] Filed: Oct. 23, 1992

[51] Int. Cl.$^5$ ............................................. B60G 7/00
[52] U.S. Cl. ................................. 280/81.6; 280/661; 180/906
[58] Field of Search ...................... 280/661, 81.6, 711, 280/688; 180/906

[56] References Cited

U.S. PATENT DOCUMENTS

| | | | |
|---|---|---|---|
| 3,342,507 | 9/1967 | Koch et al. | 280/661 |
| 3,880,439 | 4/1975 | Wolter | 280/81.6 |
| 3,880,440 | 4/1975 | Tidewell | 280/81.6 |
| 4,770,430 | 9/1988 | Lange | 280/81.6 |
| 5,015,004 | 5/1991 | Mitchell | 280/81.6 |
| 5,018,756 | 5/1991 | Mitchell | 280/81.6 |

FOREIGN PATENT DOCUMENTS

| | | | |
|---|---|---|---|
| 2202811 | 10/1988 | United Kingdom | 280/81.6 |
| 1009869 | 4/1983 | U.S.S.R. | 280/81.6 |

Primary Examiner—Kenneth R. Rice
Assistant Examiner—Christopher P. Ellis
Attorney, Agent, or Firm—Gregory J. Nelson

[57] ABSTRACT

A self steering axle system for motor coaches and similar commercial vehicles having a truss which hingedly supports an axle beam for pivotal movement between a normal positive caster angle and a negative caster angle when the vehicle is driven in reverse. The pivotal or rocking movement is achieved by a centrally positioned shift actuator acting through a yoke arm assembly and a latch which absorbs brake reaction forces. The system includes a caster lock for rendering the axle non-steerable in the event of a system failure or above predetermined operational speeds.

18 Claims, 8 Drawing Sheets

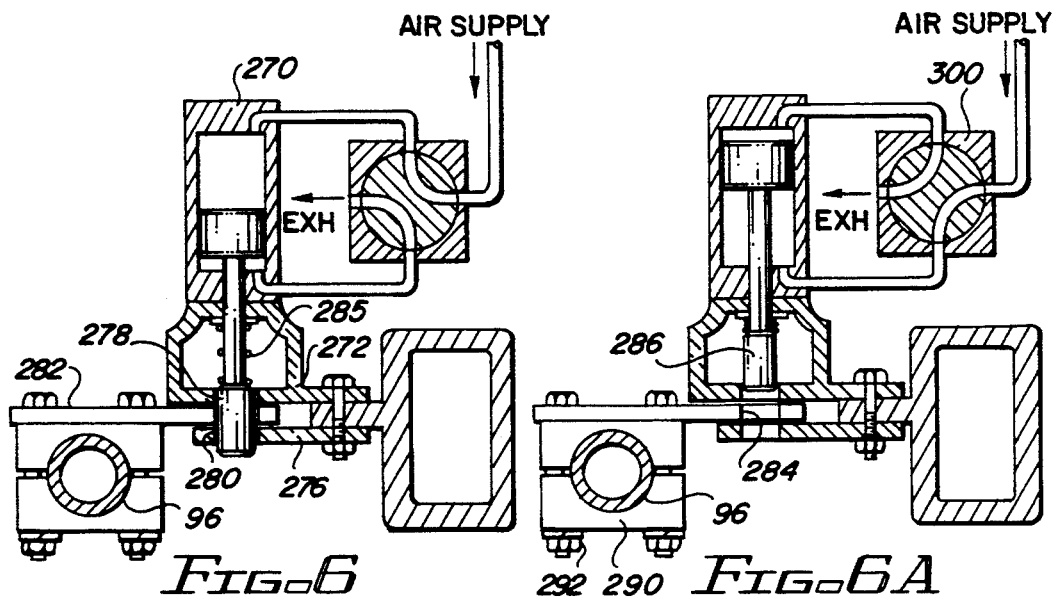
Fig. 6  Fig. 6A
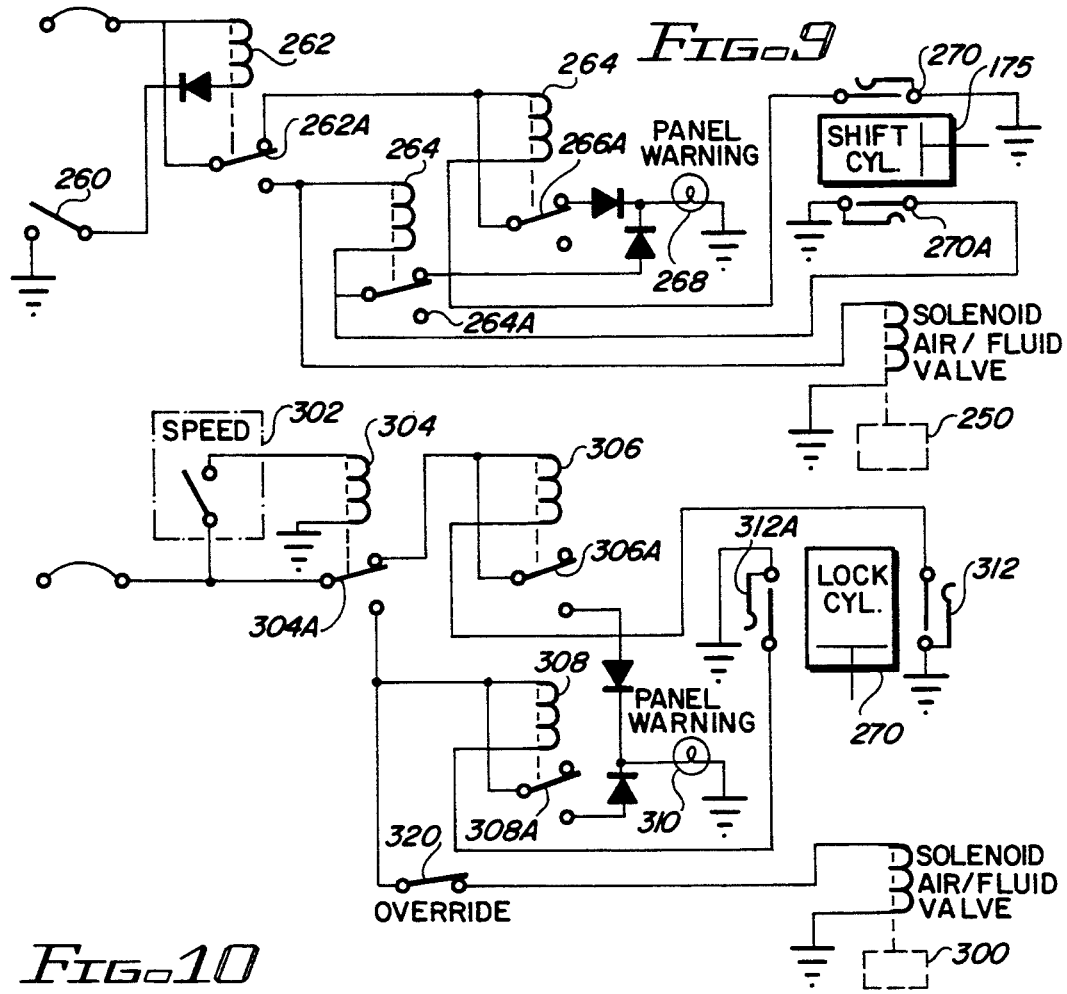
Fig. 9
Fig. 10

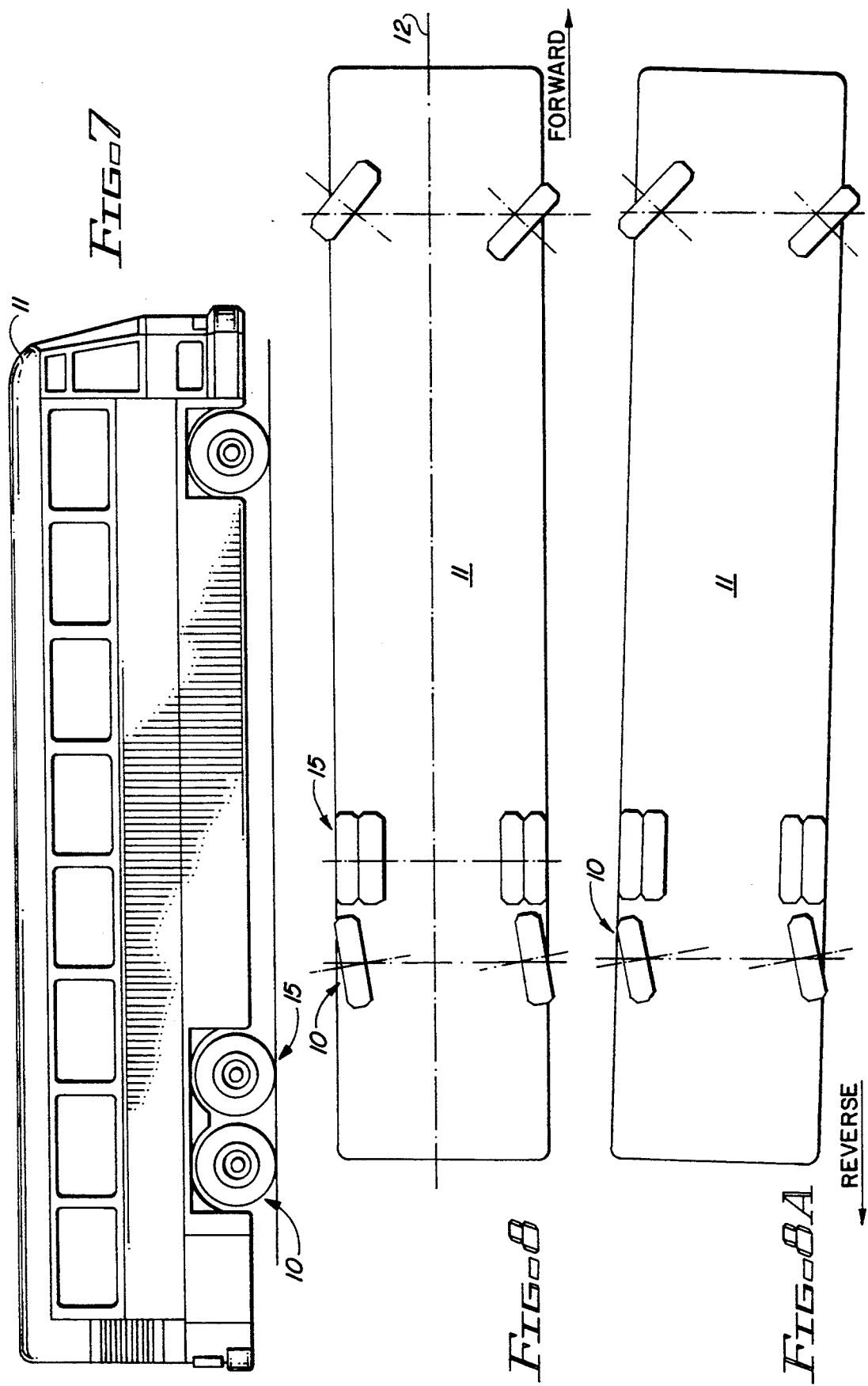

SELF-STEERING AXLE FOR VEHICLES

The present invention relates to an axle assembly for commercial vehicles such as motor coaches and trucks, and more particularly relates to a self-steering TAG axle which may be selectively rocked about a transverse axis from a normal positive caster angle to achieve negative caster for reverse vehicle operation.

Auxiliary TAG axle assemblies are commonly used to distribute loads on large vehicles such as tractor-trailer combinations, trucks and motor coaches. These axle assemblies provide certain operational advantages but tend to turn the wrong direction when the vehicle is operated in reverse. As a result, one solution in the prior art is to provide a mechanism to raise the auxiliary axle during backing up to avoid tire wear and scuffing.

Another approach in the prior art is to provide an axle system which is self steering and which allows the wheels to turn to the right or left without mechanical connection to the steering gear. For example, U.S. Pat. No. 4,770,430 discloses a self-steering axle assembly in which the longitudinal axis of the king pin assemblies are inclined at different angles for forward and reverse vehicle movement. The steering axle assembly of this patent has a transverse axle supportable on the vehicle frame with a king pin assembly mounted on the outer end of the axle with a wheel mounted on the king pin assemblies for rotation about a transverse axis. The wheels are interconnected so that they steer together through a tie rod. The axle includes a pivot affording pivotal movement of he king pin assemblies relative to the vehicle frame between a forward position and a reverse position. The king pins are selectively moved between the forward position for forward movement of the vehicle and the reverse position for backing so the wheels properly track in both directions.

U.S. Pat. No. 4,120,509 discloses a pair of transversely extending wheel axles which are slidingly and pivotally attached to a pair of longitudinally extending walking beams for the angular variation of the two-wheel axis during vehicle turning and independent movement of each axle out of the plane common to the two axles. A transversely extending steering unit pivotally attached to the walking beam between the two axles transfers the load of the vehicle to the walking beams. As the vehicle executes the turn, the steering unit rotates in the direction of the turn while the walking beams tend to maintain a straight-drive orientation. The rotation of the steering unit is transmitted to the front axle by a pair of steering arms causing the front axle to rotate relative to the rear axle in the direction of the vehicle turn.

U.S. Pat. No. 3,334,912 discloses a vehicle wheel support for trailers having an adjustably positioned wheel assembly. Each of the sets of wheels is mounted vertically pivotal about a generally longitudinally extending axis as well as vertically pivotal about a generally laterally extending axis. The vehicle support construction provides independent pivoting of each individual set of wheels to compensate for uneven surfaces in a lateral direction, independent pivoting of each individual set of wheels to compensate for uneven roads in a longitudinal direction.

U.S. Pat. No. 4,881,747 shows a suspension system incorporating upper and lower torque rods pivotally connected between a hanger and an axle. The upper torque rod is a hydraulic cylinder piston assembly. In the extended condition, the upper torque rod pivots the axle to a forward pitch in which it is self steering when the vehicle is driven forward. In the retracted condition, the upper torque rod pivots the axle to a negative pitch condition in which it is self steering when the axle is operated in a reverse direction. The hydraulic cylinder is actuable by the driver when the gears are shifted between forward and reverse. The hydraulic cylinder may be operable in response to operation of the vehicle gear shift lever.

U.S. Pat. No. 2,415,460, discloses a structure for motor vehicles such as buses having a pivoted truck having steerable wheels in which the steerable wheels are automatically adjusted by relative movement between the truck member and the superposed portion of the body.

Other patents of interest in the art are as follows:

| U.S. Pat. No. | Patentee | Title |
| --- | --- | --- |
| 2,847,228 | J. E. Hall | Wheel Suspension for Trailers |
| 3,704,896 | W. H. Buelow et al | Auxiliary Steerable Wheels For Vehicles |
| 3,880,440 | H. Tidewell | Steerable Truck With Reversible Castering Wheel Structure For Trailers |
| 4,084,833 | W. J. Mohrbacker et al | Castered Load Transfer Axle Stabilizer |
| 4,195,856 | T. A. Larson et al | High Lift Lag Axle Load Transfer System |
| 4,373,738 | D. M. Lange | Steerable Auxiliary Wheel Assembly For Vehicles |
| 4,449,727 | B. Roos | Skid Control Car |
| 5,015,004 | J. L. Mitchell | Elevating, Reversible Self-Steering Suspension System |
| 5,018,756 | J. L. Mitchell | Control For Self Steering Suspension Assembly |

Accordingly, it is a primary object of the present invention to provide a self-steering axle assembly for vehicles such as motor coaches which assembly will reduce turning radius, reduce tire scuffing and scrubbing, minimize steering effort and generally improve overall vehicle maneuverability and stability.

Briefly, the present invention provides a self-steering TAG axle for vehicles which utilizes a standard steering axle similar to the conventional front axle of a motor coach which has wheel assemblies at either end of the axle. The axle system has a truss which is positioned above the steering axle to provide a platform to support air spring bellows at either end. The truss also provides attachment locations for the upper and lower radius rods. The truss is hinged to the axle at maintenance-free, resilient or similar bushings to allow predetermined pivotal or rocking movement of the axle while restrained by the upper and lower radius rods. The rocking movement is controlled by a centrally positioned shift actuator acting on a yoke arm through a latch mechanism at the upper end of the arm. The actuator movement produces a change between positive and negative caster angles for self steering in both forward and backward vehicle travel directions. To ensure that brake reaction and road input forces are kept out of the caster actuation circuit, the mechanical latch mechanism provided at the upper end of the arm absorbs brake reaction forces bypassing the actuator. The system is completed by a tie rod lock mechanism which provides an override to render the axle nonsteerable in the event of a system failure. The tie rod lock consists of an actuator having a piston with a lock pin which is extended when the system fails to lock the tie rod extending between the wheels. An adaptation of the tie rod lock mechanism may be used as an alternative to the aforementioned mechanical latch mechanism for caster change locking purposes. The activation of the tie rod lock and shift operations may be accomplished by various control devices which sense operational conditions, either electrical or mechanical. A speed switch can be set to energize the tie rod lock in the locked position above a predetermined speed for stability. The locking function may be achieved at anytime by a manually operable override switch.

The above and other objects, aspects and advantages of the present invention will become apparent from the following detailed description, claims and drawings in which:

FIG. 6 is a detail view partly in schematic of the tie rod lock as indicated in FIG. 2 in a locked position;

FIG. 6A is a detail view partly in schematic of the tie rod lock in an unlocked position;

FIG. 7 is a side elevational view of a motor coach embodying the self steering axle shown in the normal forward direction of vehicle travel;

FIG. 8 illustrates the underside of a motor coach chassis equipped with a self-steering axle with the wheels shown in a forward left turn position as indicated by the arrow;

FIG. 8A illustrates the underside of a motor coach chassis equipped with a self steering axle with the wheels shown in a backing right turn position as indicated by the arrow;

FIG. 9 is a representative schematic diagram of the electrical and pneumatic systems for the caster latch;

FIG. 10 is a representative schematic diagram of the tie rod lock system; and

The self-steering axle system of the present invention is generally designated by the numeral 10 and is of the type which is operatively secured to a vehicle such as a bus or motor coach 11 behind the fixed drive wheels 15, as shown in FIG. 7. Normally the vehicle engine of a motor coach is located rearward of the rear wheels and the drive shaft extends forward to drive wheels 15.

Figure 4:
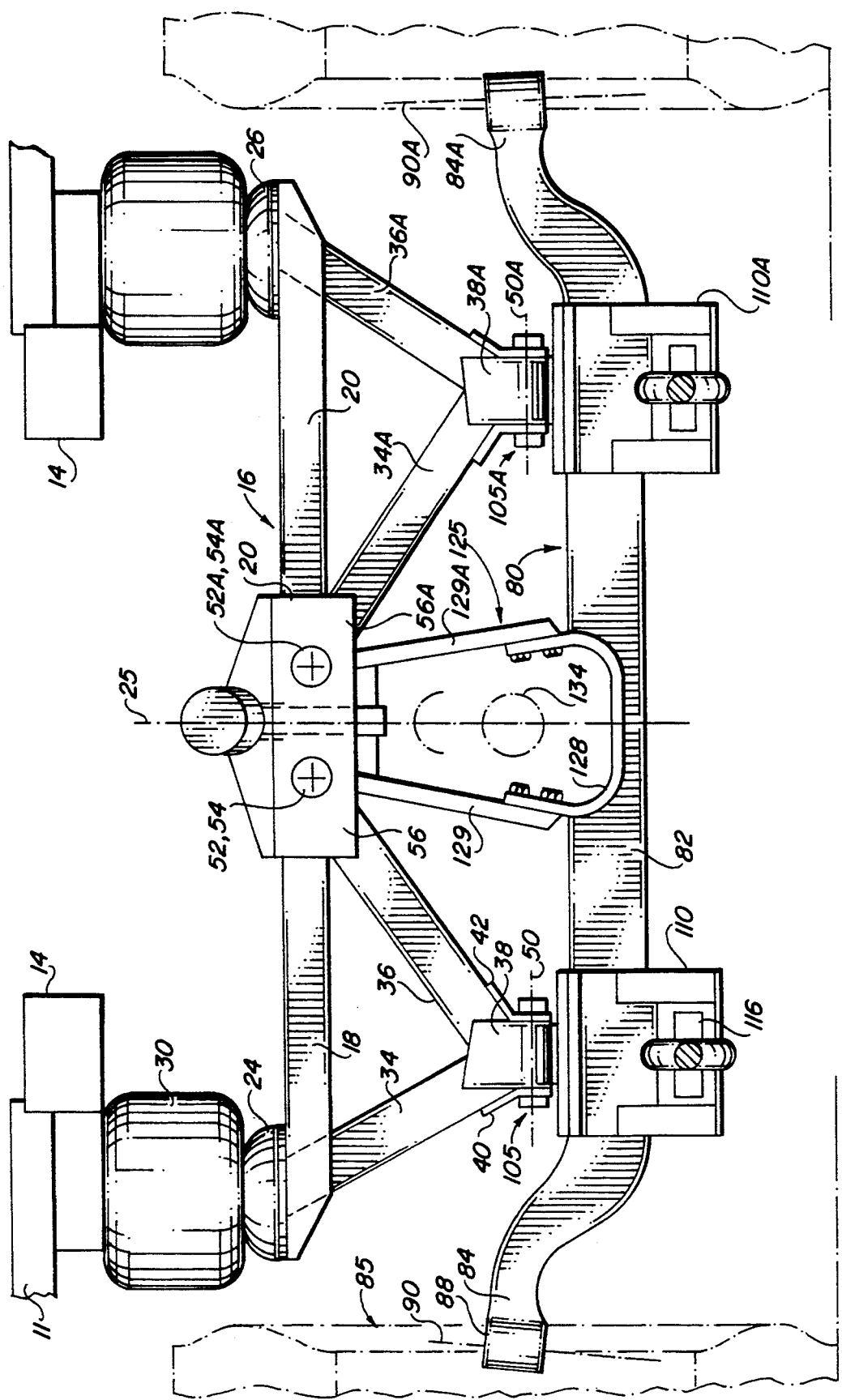
FIG. 4 is an elevational view of the self steering axle taken from the rear of the axle.

As seen in FIG. 4, the vehicle 11 has a chassis with frame members 14 to which the self steering axle assembly 10 is attached at spring members shown as air bellows 30, 32 interposed between the axle and frame. The axle assembly has a superstructure in the form of a suspension truss generally designated by the numeral 16 having transversely-extending structural members 18 and 20 which at their inner ends are connected to a junction box 22 centrally located on the longitudinal centerline 25 of the vehicle. The junction box and truss are symmetrical with respect to centerline 25. The outer end of the horizontal truss members 18 and 20 support pads 24 and 26 located on the upper surface of the truss members. Air spring or air bellows assemblies 30 and 32 are interposed between the ends of the horizontal truss members and the vehicle chassis. The air springs have a resilient, bladder-like housing and are connected to a source of compressed air for selectively inflating and deflating the air springs through a suitable control arrangement to control the ride of the vehicle, as is well known in the art.

The description herein is with reference to a parallel arm suspension system but it is to be understood that the axle arrangement may be used with other types of suspensions such as trailing arm and leaf spring systems which are well-known. With such systems, the suspension member would be directly attached to the truss or beam and the truss or beam would embody the hinge element to provide the axle rocking motion.

The left side of the suspension truss arrangement as viewed in FIG. 4 has a pair of downwardly converging structural members 34 and 36 which are connected at their lower end by welding. A reinforcing side plate 38 may be provided at the intersection of the structural members 34, 36. The members 18, 34 and 36 are arranged in a general triangular configuration establishing a portion of a structural truss.

The right hand portion of the suspension truss is similarly configured having members 34A and 36A joined at their lower ends and reinforced by plate 38A forming another triangular configured truss section. A retainer plate 40 is welded to the outer surface of truss member 34. Similarly, a plate 42 is welded to the side of truss member 36. Plates 40 and 42 each define an aperture or bore 44 which receive an extending portion of axle hinge connection, as will be explained. Plates 40A and 42A are similarly positioned at the lower ends of truss members 34A and 36A and receive the right hand axle hinge connection. The transversely extending transverse centerline of the axle hinge connections are indicated by the numerals 50 and 50A.

An upper radius rod 52 has its inner end 54 retainably received within section 56 of the upper radius rod junction box 20. The opposite end of the upper radius rod 52 is pivotally secured to frame member 60 at connection 62 in conventional manner. Radius rod 52A extends in similar manner having its inner end 54A received in the section 56A of the upper radius rod junction box. The outer end of the radius rod 52A is connected to fixed frame member 60 at connection 62A. The radius rods are provided with conventional torsional rubber bushings and are of fixed length. The upper radius rods along with the lower radius rods, as will be explained in detail hereafter, establish a fixed length suspension system.

The axle portion of the assembly is generally designated by the numeral 80 and is hinged to the truss and includes a generally horizontally extending intermediate beam section 82 having opposite ends 84 and 84A. The intermediate beam section 82 may be solid or may be in the form of a box-like structural member as indicated and may be a standard front steering axle. The ends 84 and 84A are vertically offset from section 82 and each defines a generally vertically extending bore 88, 88A which bores are adapted to receive the king pin of the associated wheel assembly 85.

Figure 1:
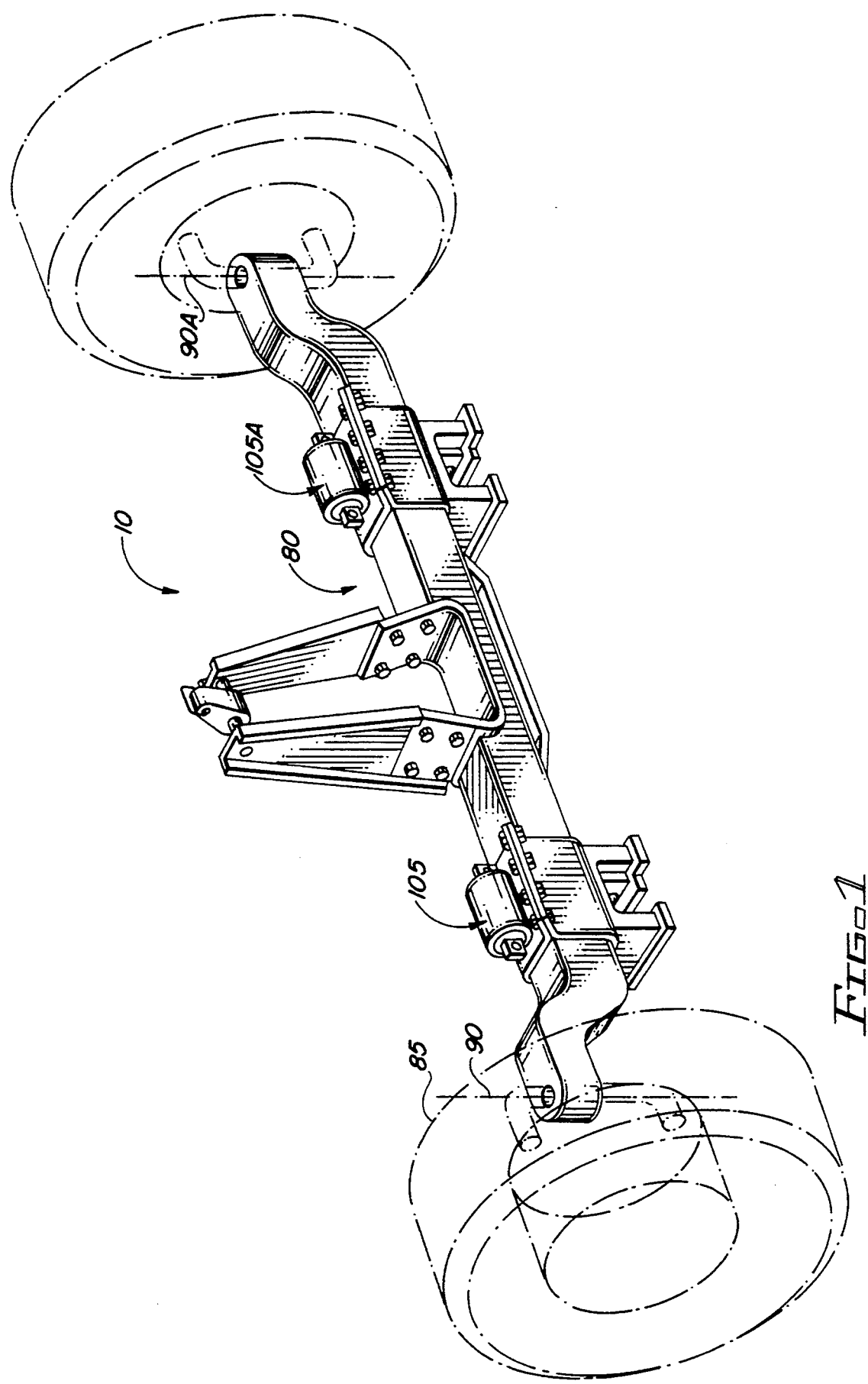
FIG. 1 is a perspective view of the self steering axle of the present invention with the opposed wheel assemblies shown in dotted lines.
Figure 2:
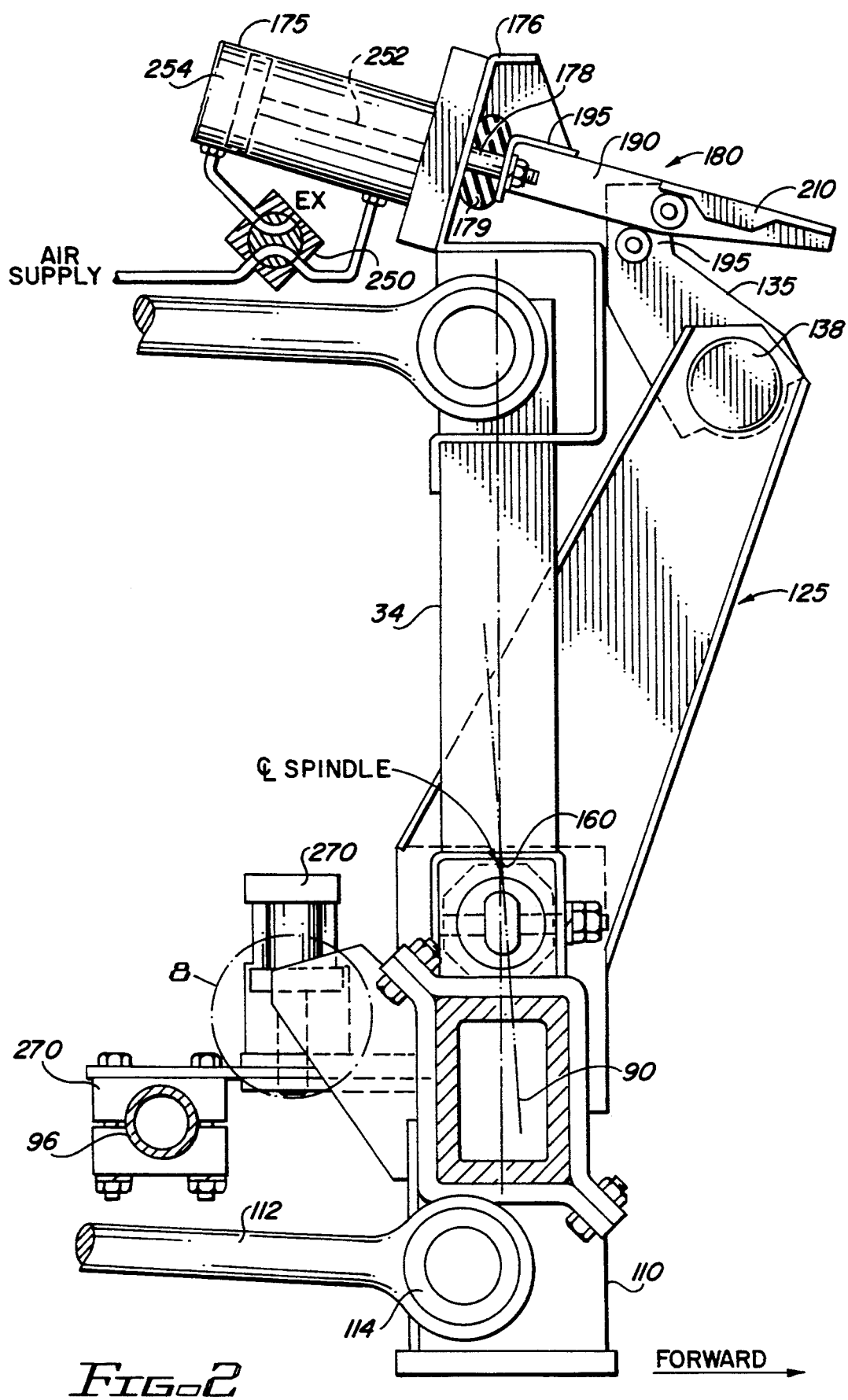
FIG. 2 is an enlarged, side elevational view of the axle assembly shown in a forward operating position with the shift control circuit shown schematically.
Figure 3:
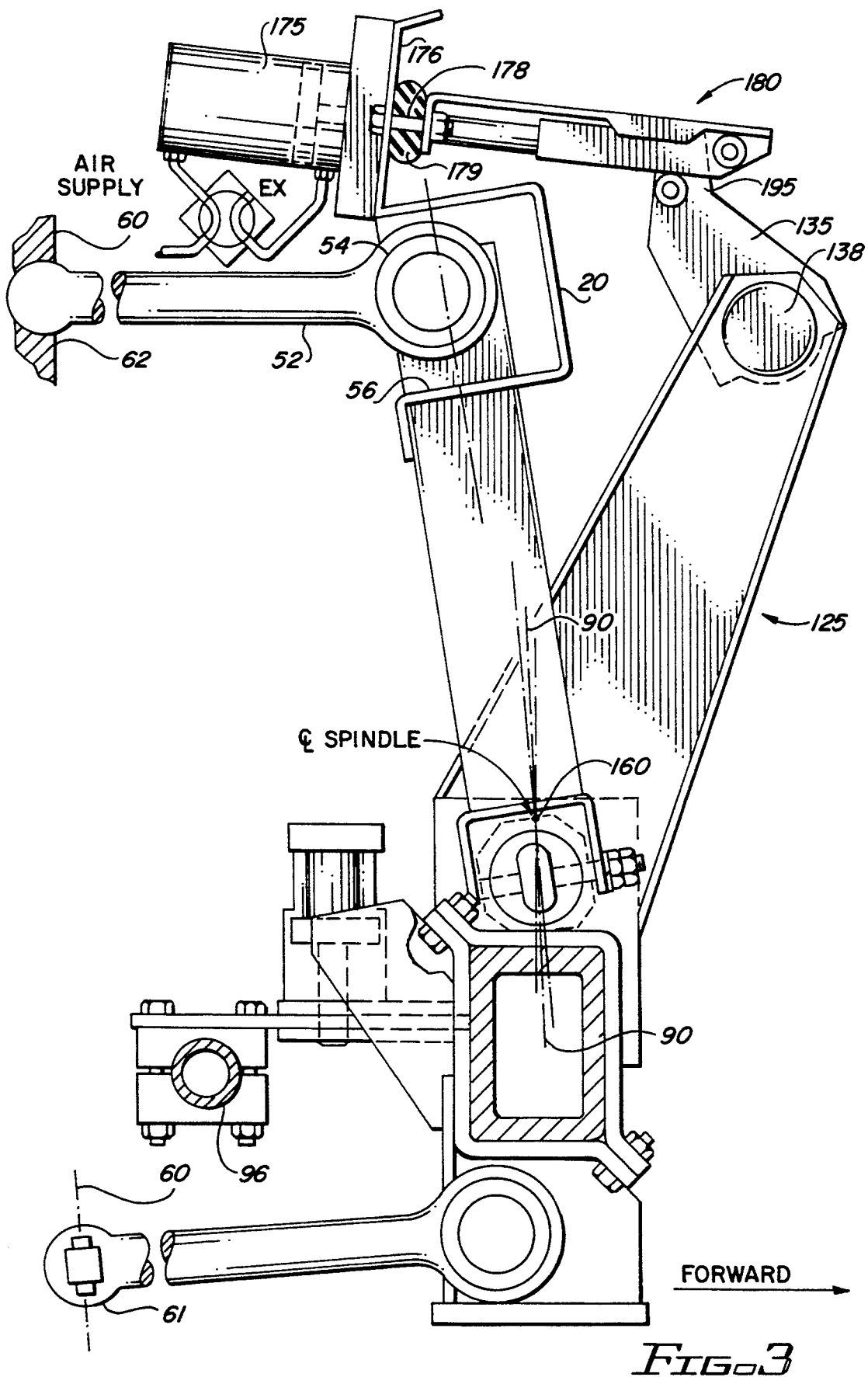
FIG. 3 is an enlarged, side elevational view of the axle assembly shown in a reverse operating position with the shift control circuit shown schematically.

The steering assembly includes a king pin assembly which is pivotal about the axes 90 and 90A at each wheel 85. As indicated, the axle may be a standard front steering axle and wheel assembly with drums or discs and brakes, not shown. The conventional steering arm or steering mechanism is not required and is omitted. As best seen in FIGS. 2 and 3, a tie rod 96 extends transversely between the wheels 85 and is located forward or to the rear of the axle assembly. The pivotal connections between the ends of the tie rod 96 and the wheels are conventional and further description is not deemed necessary. As seen in FIG. 3, the kingpin angle (caster) is shown as −3° from the vertical plane.

The axle 80 is mounted so that it may be rocked or pivoted about hinge connections 105, 105A from a predetermined normal positive caster angle to a negative caster angle. For example, in the normal forward travel mode, a positive caster angle of approximately 3° is maintained. When the vehicle is placed in reverse, a rocking action occurs in the hinge connections to produce a change in caster from the normal built-in positive angle to a negative angle, for example −3° which is sufficient to yield effective caster action when the wheels rotate in the reverse direction. Connections 105 and 105A are rubber bushed and are positioned at spaced-apart locations attached to the upper surface of the axle beam 82 and are connected to the lower ends of the triangular truss sections.

A first box-like receptacle 110 is positioned below the hinge assembly 105 on the underside of the left-hand section of the axle. A similar box-like receptacle 110A is positioned on the underside of the right-hand section of the axle below the hinge assembly 105A. Radius rod 112 has one end 114 secured in receptacle 110 by transversely extending pin 116. The opposite end of lower radius rod 112 is secured to the lower end of frame member 60 by transversely extending pin connection 61. The opposite lower radius rod 112A extends in similar fashion between frame member 60 and box 110A. The upper and lower radius rods establish the geometry of the suspension system and assume the respective positions in forward and reverse travel as seen in FIGS. 2 and 3.

Caster angle control of the axle beam 80 is imparted through a yoke arm assembly 125. The yoke arm is centrally positioned on the axle member 82 and has a general U-shaped mounting bracket 128 at its lower end which is centrally attached to the upper surface of the axle. A pair of upwardly extending arms 129 and 129A are attached to the ends of the U-shaped mounting bracket 128. The arms 129 and 129A extend forwardly and angle slightly inwardly toward the vehicle centerline 25. The upper end of arms 129 and 129A are joined to a centrally positioned latch arm 135. The latch arm 135 is secured to the arms by cross-member 138 extending between the upper end of arms 129 and 129A. The latch arm 135 is part of a latching mechanism 180 that controls the caster angle shift cycle. The latching mechanism will be described in detail hereafter. The yoke arm assembly 125 permits the drive shaft 134 to pass through the yoke arm at a longitudinally central position with respect to the vehicle. The yoke arm serves as a containment housing in the event of drive shaft breakage.

In the normal forward operating position, the self steering axle assembly is in the position shown in FIG. 2 having a predetermined positive caster angle as for example 3°. The center of the spindle is in the position indicated by the numeral 160 and the centerline of the king pin in the forward position is indicated by line 90. When the axle assembly is rocked about the lateral axis through the hinge connections 105 and 105A, a caster angle change is imparted from the normal positive caster angle to a negative caster angle as for example a negative 3°. In the negative caster angle position shown in FIG. 3, the spindle center assumes the position indicated by the numeral 160 and the axis of the king pin has shifted to the position indicated by the numeral 90.

Simultaneous activation of the caster change for both wheels is accomplished by a force applied from a single power source to the upper end of the actuator yoke arm 125. The actuation force is shown applied by an actuator such as an air cylinder 175 centrally mounted on the top of the superstructure at bracket 176. A resilient bushing 179 is interposed between the bracket and the latch. It will be obvious that a hydraulic system could also be utilized. The cylinder has an extensible rod 252 which applies an actuating force to the yoke and axle through latch mechanism 180 as will be explained. The force generated by the cylinder 175 is required only to overcome the caster shift resistance. Brake reaction forces are not imposed in the caster shift actuation system when the vehicle is at rest or in forward motion. In reverse, braking forces in the actuation circuit are of low order of magnitude and can be absorbed by the cylinder.

To insure that brake reaction forces are eliminated from the caster shift actuation circuit in the forward motion mode, latch mechanism 180 is incorporated which absorbs brake reaction forces, bypassing the actuating cylinder. In the event of a system failure, the latch mechanism 180 also maintains the structural integrity of the axle for brake reactions. Without the latch feature, braking loads and shock loads would have to be absorbed by the cylinder 175. These loads are considerably higher than those required to achieve the shift cycle alone. Further, loss of cylinder pressure would allow an uncommanded shift to the back-up mode to occur.

The latch mechanism 180 is best seen in FIGS. 5, 5A, 5B and 11 and consists of a clevis 190 having a generally U-shaped configuration with horizontal top 191 and opposite side walls 192 and 194. The clevis extends axially and is secured to the end of cylinder rod 252. The upper end of the latch arm 135 has an upwardly projecting tab 195 which extends between the side walls 192 and 194 of the clevis. A thrust bar 200 extends transversely between the side walls of the clevis spaced inwardly from the distal end of the clevis. The outer end of the clevis carries a roller 202 secured on axle 204 extending transversely between the walls of the clevis. Rollers 205 and 205A are provided on opposite sides of the latch arm 135 and engage the bottom edge of the clevis side walls.

A latch tongue 210 straddles clevis 190 and is secured to truss bracket 176, through loosely fitting holes by a pair of bolts 178 located on opposite sides of cylinder 175. The latch tongue 210 is biased downwardly by a pair of annular elastomeric bushings 179 located on the attachment bolts. The bushings are compressed between the latch tongue 210 and the bracket 176. A greater compressive force is applied to the upper side of the bushings to yield the required downward bias for the appropriate latching action. Differential adjustment of the bolts provides azimuth adjustment for optimum alignment of the tongue apertures 215 and 220 with the tab 195 of the latch arm 135. Mechanical springs arranged in conventional manner may be used to provide bias in lieu of bushings 179.

Figure 5:
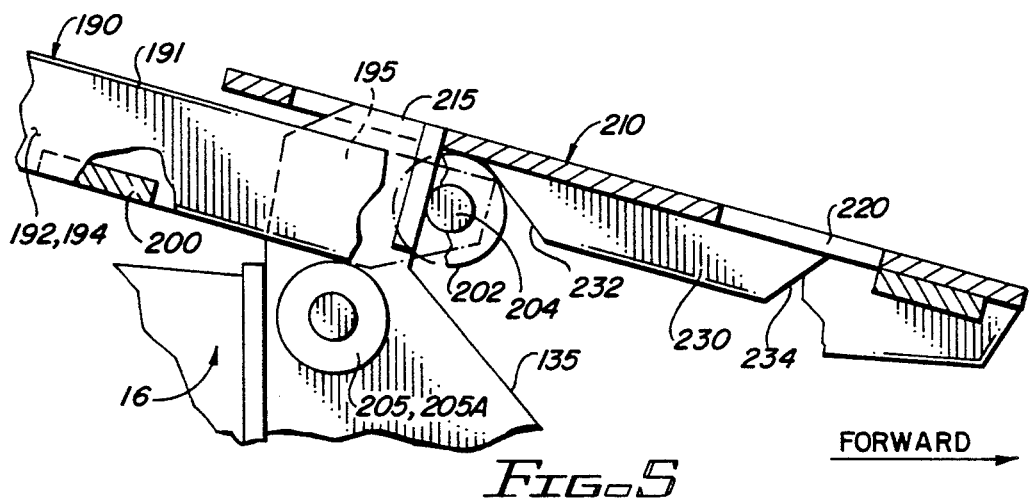
FIG. 5 is a side elevational view of the latching mechanism in the normal latched forward position.
Figure 5A:
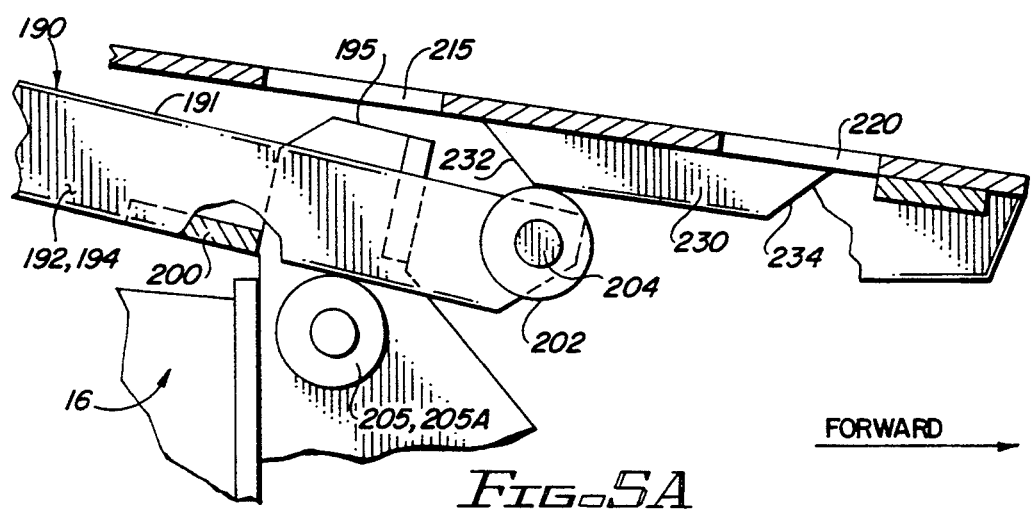
FIG. 5A is a side elevational view of the latching mechanism in the unlatched forward position.
Figure 5B:
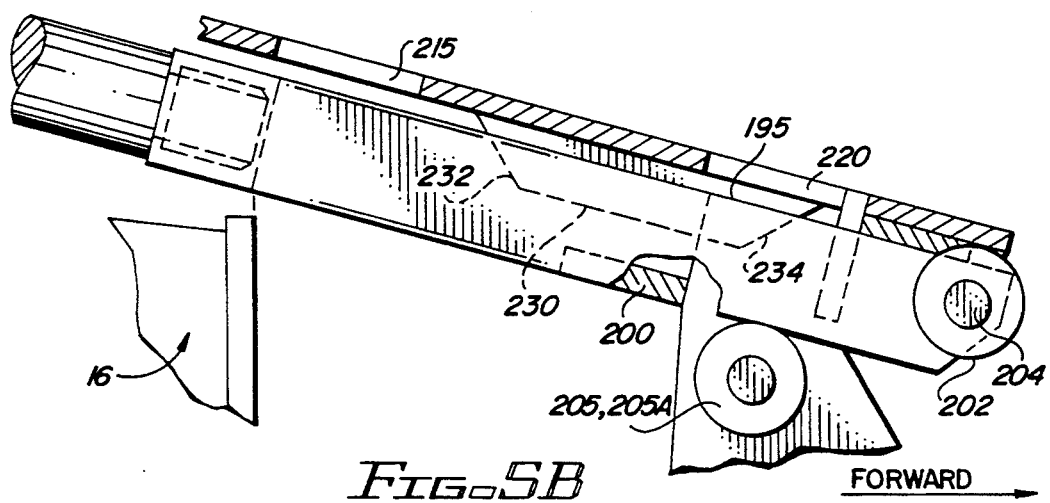
FIG. 5B is a side elevational view of the latching mechanism in the backup position.
Figure 11:
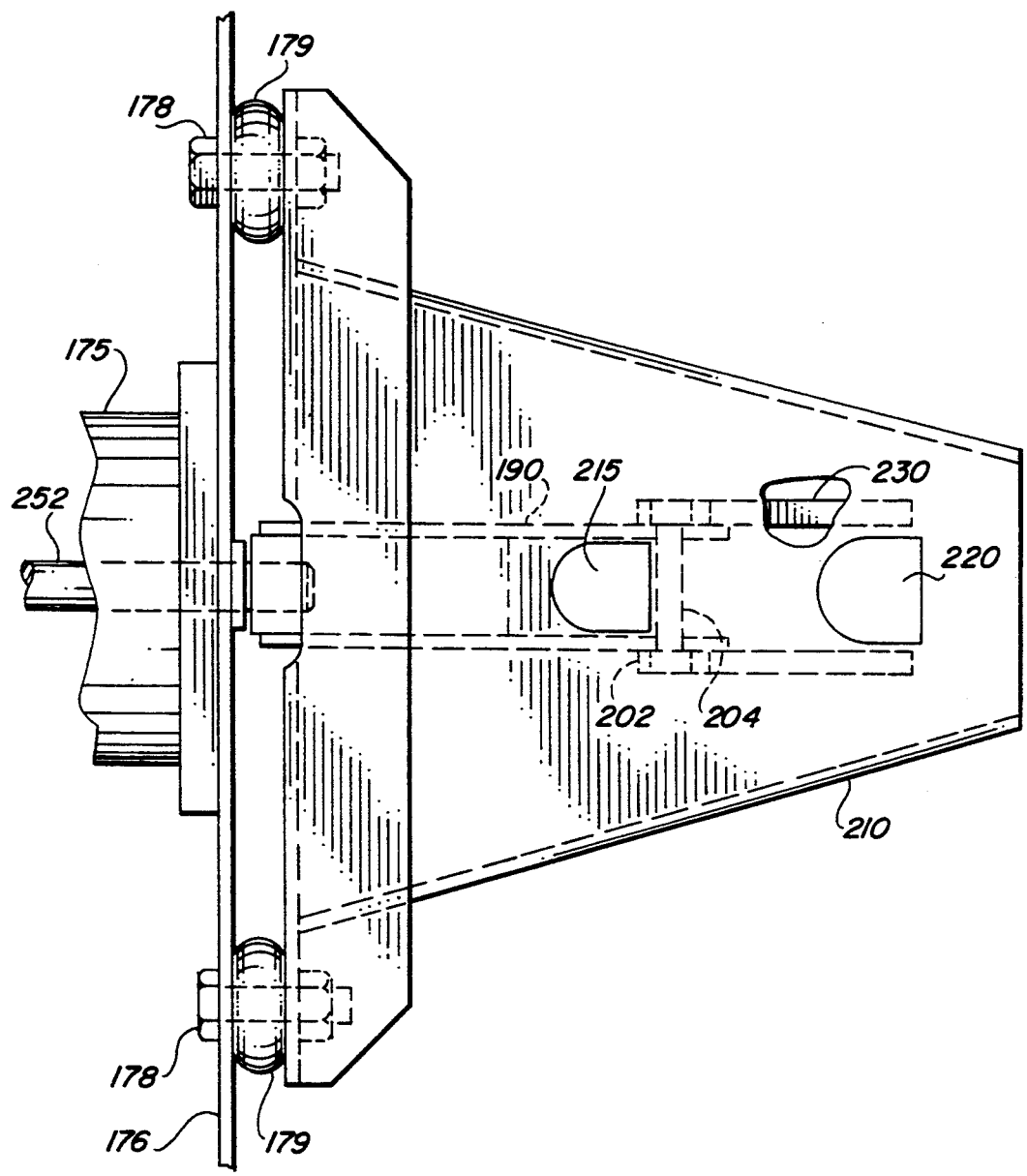
FIG. 11 is a top view of the latch shown in FIG. 5.

The tongue defines two axially spaced-apart apertures 215 and 220. Aperture 220 is located near the distal end of the latch tongue and aperture 215 is spaced inwardly. In the normal latched position, tab 195 at the upper end of the latch arm post engages aperture 215 as shown in FIG. 5. In the back-up position, tab 195 on the end of the latch arm post is engageable in aperture 220 as seen in FIG. 5B.

The clevis 190 traps the latch arm 135 translating linear motion of the piston rod 178 to rotational motion of the axle. Thrust forces are exerted by the thrust bar 200 and retraction forces are exerted through the roller axis pin on the end of the clevis.

A cam 230 depends from the latch tongue having inclined cam surfaces 232 and 234 at opposite ends. These cam surface translate the horizontal linear motion of the cylinder to rotational motion of the tongue upwardly to release the actuating arm. The rollers 202 on the clevis support the tongue at the correct position and reduce surface friction throughout its travel range. Rollers 205, 205A on the arm 135 support the clevis preventing bending loads from reaching the cylinder ram or piston.

The operational sequence of the latch mechanism is as follows: The latch mechanism is in a normal position as shown in FIGS. 2 and 5 prior to receipt of any input signals. The operating system is shown as a pneumatic system, although it may also be hydraulic and is described hereafter with respect to FIG. 9. Solenoid valve 250 is positioned so that supply air is directed to the rod end 252 of cylinder 175 and the cylinder head end 254 is connected to exhaust. The actuator 175 is fully retracted so that the clevis is retracted trapping tab 195 and securing the arm 135 against the truss 16, as seen in FIG. 5. In this position, the axle has a predetermined positive caster angle, as seen in FIG. 2. The thrust bar 200 is spaced from the upper tab 195 on the actuating arm post.

As indicated by FIG. 9, shifting the vehicle into reverse gear will cause either a mechanical sensor or electrical sensor in the back-up light circuit to open valve 250 exhausting air or hydraulic pressure from the rod end 252 of the cylinder 175.

Solenoid valve 250 is operatively connected to the shift cylinder 175 as shown in FIGS. 2 and 3. The system is shown in FIG. 9 and operates from the back-up light switch 260 which, when energized, energizes relay 262 and associated contact 262A. Valve 250 has a spring return so that at start-up, the axle is in the forward mode, FIG. 2. Panel indicator light 268 is out. When the operator selects reverse gear, relay 262 is energized closing contact 262A causing the shift panel light 268 to illuminate and energizing valve 250 directing air to the head end 254 of the cylinder. Reed switch 270A senses the end of the shift cylinder travel and energizes relay 264 opening contacts 264A extinguishing the panel light 268.

When the operator shifts out of reverse, the panel light illuminates and air valve 250 under the influence of the spring return, directs air to the rod end 252 of the cylinder. Reed switch 270 senses the limit of the cylinder travel and extinguishes the light 268. In the event a power failure occurs, the system will shift to the forward travel position shown in FIG. 2.

In the reverse mode, the head end 254 of the cylinder is pressurized to extend the piston and rod 178. The rod and clevis extend and the clevis roller 202 contacting the cam 230 on the tongue forcing the tongue upwardly against the spring pressure exerted by members 179, disengaging the latch arm post from the latch tongue, as seen in FIG. 5A. Further extension of the cylinder piston will cause the thrust bar 200 to engage the latch arm post forcing the latch arm post outwardly with the thrust bar.

When the cylinder travel approaches the end of its stroke, as seen in FIG. 5B, the clevis rollers are clear of the tongue cam allowing the tongue to drop down trapping the actuating arm post in the second aperture 220 located near the distal end of the latch tongue. The axle assembly has now assumed the negative caster angle position shown in FIG. 3. Cylinder 178 is maintained in the extended position until the operator makes a gear shift change out of reverse causing the axle to return to the forward position of FIG. 2 as described above.

The functional sequence of events from back-up mode to the normal mode is essentially the reverse of that described above and therefore detailed description is not necessary.

To complete the system, a tie-rod lock mechanism provides a number of operational advantages, including the provision of an override feature to render the vehicle operable as a non-steerable axle in the event a system failure results in the axle being stuck in an undesirable caster position. The tie-rod lock also restores skid control effective at vehicle highway speeds. The tie-rod lock mechanism is best seen in FIGS. 2, 3, 6 and 6A and is associated with the transversely extending tie rod 96. The tie-rod lock includes a lock cylinder 270 which is mounted on bracket 272 extending outwardly from the axle beam. A lower plate 276 also extends from the axle defining a space with bracket 272. A pair of aligned apertures 278 and 280 are provided in plates 272 and 276, respectively. Plate 282 is slidable between plates 252 and 256. An aperture 284 is provided in plate 282 and aligns with apertures 278 and 280. Cylinder 270 is provided with a lock pin 286 secured to the piston rod. The pin 286 is aligned with the three apertures and normally the lock pin is held in the extended position of FIG. 6 by spring 285 interposed between the body of the cylinder and retaining washer 287 which extends annularly about the pin. In the extended position, the pin engages the apertures in all three plates locking the tie rod 96 which is secured by a clamp 290 at bolts 292 at the outer end of the intermediate plate 262. This arrangement locks the tie rod, the latter being in double shear eliminating bending stress being imposed on the lock pin and cylinder rod.

The tie rod lock cylinder 270 is pressurized across solenoid-operated valve 300 when the system is operated causing the lock pin 286 to be retracted from the apertures freeing the tie rod 96 for self-castering.

FIG. 10 is a schematic diagram of the tie rod lock actuator system. When main power source is off, the spring return on the solenoid valve 300 ensures that the tie rod is locked. FIG. 10 is a simplified electrical diagram of the tie rod lock circuit with the power "off".

When power is "on", valve 300 is energized to direct air to retract the lock pin 286 to the position shown in FIG. 6A. The panel warning light 310 remains off and the tie rod is unlocked. At a predetermined speed, speed switch 302 deenergizes the valve 300 and the tie rod is locked. Below the predetermined speed, the speed switch 302 will re-energize the air valve 300 to unlock the tie rod.

The override switch 320 permits the operator to manually cut off power to lock the tie rod. The reed switches 312 and 312A sense the position of the locking cylinder illuminating the panel warning light if abnormalities occur.

From the foregoing it will be appreciated that the self steering axle of the present invention provides the following advantages:

1. The axle system utilizes a standard front steering axle with tie rod, drums, brakes and wheels but without steering arm and/or steering mechanism.

2. A superstructure or truss is provided which provides a support for air bellows and suspension elements or other spring damper devices.

3. The hinge connections are transversely located on the bottom of the truss or superstructure to provide hinge points for the axle assembly. Rocking or pivoting occurs about a lateral axis to produce a change in caster from the normal, positive angle through 0° to a negative angle sufficient to yield effective caster action when the vehicle is operated in reverse.

4. Simultaneous activation of caster change for both wheels is achieved by actuation force applied from a single centrally positioned source.

5. The connecting member between the shift force application point and the axle serves as a containment yoke for the drive shaft in the event of drive shaft breakage.

6. The position of the system components optimizes mass and force requirements for effective conservation of weight and operating energy demands.

7. The forces generated by the power source (air or hydraulic cylinder) are required to overcome caster shift resistance only. Brake reaction forces do not enter the caster shift actuation circuit when the vehicle is at rest or in forward motion. In reverse, braking forces in the actuation circuit are lower and can be absorbed by the cylinder.

8. To ensure that brake reaction forces are kept out of the caster shift actuation circuit in the forward motion mode, a supplementary mechanical latch mechanism is incorporated. This mechanism absorbs brake reaction forces bypassing the actuating cylinder/circuit.

9. Timing of latching and unlatching functions of the mechanism is dependent on cylinder sensing movement.

10. Latching and unlatching functions are achieved by utilizing a portion of the actuating cylinder stroke.

11. In the event of a system failure (electrical/pneumatic/hydraulic) The latch mechanism ensures that structural integrity for brake reactions is mechanically maintained.

12. The axle hinge joint geometry allows the use of fixed-length suspension members throughout. With fixed-length suspension members, the geometric integrity of the system is optimized, i.e. in forward vehicle motion the suspension system and air bellows functions are unaffected by the design. With the vehicle in reverse, no deviant displacement of air bellows is caused by the design throughout its range of travel. A negligible tilt angle only is introduced to the base of the air bellows in this mode.

13. Signals for automatic activation of the caster shift cycle through a variety of known control devices (hydraulic/electrical/pneumatic/solenoid valving, etc.) are available from various sources on the vehicle, e.g. back-up light, back-up light switches, back-up controls or levers, etc.

14. A tie-rod lock mechanism is included to provide an override feature to render the vehicle operable as a non-steerable axle in the event that a system failure results in the axle being stuck in the "reverse" mode and to restore skid control effectiveness to the vehicle at highway speeds.

15. The tie rod lock cylinder is activated when the master switch is on and causes the lock pin to be retracted freeing the tie rod for self-castering.

16. A speed switch controlled from the speedometer can be set within the desired speed range to energize the tie rod lock cylinder to the "lock" mode above the set speed.

17. In the event of an air or electrical system failure, a spring load feature on the cylinder pin ensures that the tie rod is locked.

18. Indicator lights on the instrument panel are illuminated whenever a "lock" or "latch" abnormality occurs. The visual warning system may be augmented by an audible warning system.

It will be obvious to those skilled in the art to make various changes, alterations and modifications to the self steering axle assembly described herein. To the extent that such changes, alterations and modifications do not depart from the spirit and scope of the appended claims, they are intended to be encompassed therein.

I claim:

1. A self steering axle assembly for a vehicle having a frame and a back-up system for effecting a caster angle change from positive to negative upon the vehicle being shifted from forward travel to reverse travel, said axle comprising:
   (a) a suspension truss member extending transversely of the vehicle and being secured thereto;
   (b) an axle beam extending transversely of said vehicle and being hinged to said truss member for rocking movement relative thereto between a positive and a negative caster angle, said axle beam having opposite ends for receiving a king pin assembly and associated wheel assemblies;
   (c) arm means extending from said axle beam at a central location; and
   (d) actuator means operably connected to said arm means at connector means for selectively rocking said axle beam to effect a predetermined change of caster angle.

2. The axle of claim 1 wherein said arm means comprises a centrally positioned yoke.

3. The axle of claim 1 further including spring means interposed between said truss member and said frame and fixed length suspension members extending between said axle and truss and said frame.

4. The axle of claim 3 wherein said spring means comprises at least one inflatable bellows and said suspension member comprises an upper pair and a lower pair of radius rods.

5. The axle of claim 1 further including a control system response to vehicle travel direction to selectively actuate said caster change actuator.

6. The axle of claim 5 wherein said control system is operatively responsive to energization of the vehicle back-up indicator system.

7. The axle of claim 1 wherein said actuator is an air cylinder centrally positioned along said axle.

8. The axle of claim 1 further including a tie rod extending between the vehicle wheel assemblies.

9. The axle of claim 8 including locking means for selectively locking said tie rod and a control system for selectively actuating said locking means.

10. A self steering axle assembly for a vehicle having a frame and a back-up system for effecting a caster angle change from positive to negative upon the vehicle being shifted from forward travel to reverse travel, said axle comprising:
   (a) a suspension truss member extending transversely of the vehicle and being secured thereto;
   (b) an axle beam extending transversely of said vehicle and being hinged to said truss member for rocking movement relative thereto between a positive and a negative caster angle, said axle beam having opposite ends for receiving a king pin assembly and associated wheel assemblies;
   (c) arm means extending from said axle beam at a central location;
   (d) actuator means operably connected to said arm means at connector means for selectively rocking said axle beam to effect a predetermined change of caster angle; and
   (e) a latch member interposed between said actuator means and said arm means, said latch member having means to absorb brake reaction forces when the vehicle is traveling in a forward direction.

11. The axle of claim 10 wherein said latch member includes a latch tongue secured to the frame defining a first positive caster angle position and a second negative caster angle position, said first position placing said arms adjacent said truss.

12. The axle of claim 4 further including camming means operative to disengage said latch member during shifting.

13. The axle of claim 9 further including an override to selectively render the axle non-steerable in the event of a control system failure.

14. The axle of claim 9 wherein said control system includes speed sensing means which is operable to activate said tie rod locking means above a predetermined speed.

15. The axle of claim 11 including adjustable biasing member interposed between said tongue and said frame permitting the relative position of said tongue and arm means to be adjusted.

16. A vehicle operable in forward and reverse directions of travel and having a control system indicating travel direction, said vehicle including:
   (a) a superstructure extending transversely of the vehicle having fixed length suspension members attached thereto, said superstructure comprising a suspension truss;
   (b) an axle beam extending transversely of said vehicle generally subjacent said superstructure and being hingedly connected to the superstructure for pivotal movement between a normal positive caster angle for forward travel and a negative caster angle for reverse travel, said axle beam having wheel assembles at opposite ends thereof and having a tie rod extending therebetween;
   (c) shift arm means extending at an intermediate location along said axle beam;
   (d) power means for selectively moving said shift arm means to effect a caster angle change;
   (e) latch means associated with said shift arm means having means to absorb reaction forces in forward travel; and
   (f) locking means for selectively locking said tie rod to render said axle operable as a non-steering axle.

17. The vehicle of claim 16 wherein said power means comprises a pneumatic cylinder and said power means is responsive to said control system to effect a change in caster angle.

18. A self steering axle assembly for a vehicle having a frame and a back-up system for effecting a caster angle change from positive to negative upon the vehicle being shifted from forward travel to reverse travel, said axle comprising:
   (a) a suspension truss member extending transversely of the vehicle and being secured thereto;
   (b) an axle beam extending transversely of said vehicle and being hinged to said truss member for rocking movement relative thereto between a positive and a negative caster angle, said axle beam having opposite ends for receiving a king pin assembly and associated wheel assemblies;
   (c) arm means extending from said axle beam at a central location;
   (d) actuator means operably connected to said arm means at connector means for selectively rocking said axle beam to effect a predetermined change of caster angle;
   (e) a tie rod extending between the vehicle wheel assemblies; and
   (f) locking means for selectively locking said tie rod including control means for selectively actuating said locking means, said locking means further including a clamp associated with said tie rod secured to a slidable locking plate defining an aperture and fixed second actuator means having a locking pin normally out of registry with said aperture and being selectively operable to move said locking pin into registry with said aperture to lock said tie rod.

* * * * *